United States Patent
Yitbarek et al.

(10) Patent No.: US 11,836,262 B2
(45) Date of Patent: *Dec. 5, 2023

(54) PROTECTION OF COMMUNICATIONS BETWEEN TRUSTED EXECUTION ENVIRONMENT AND HARDWARE ACCELERATOR UTILIZING ENHANCED END-TO-END ENCRYPTION AND INTER-CONTEXT SECURITY

(71) Applicant: Intel Corporation, Santa Clara, CA (US)

(72) Inventors: Salessawi Ferede Yitbarek, Hillsboro, OR (US); Lawrence A. Booth, Jr., Phoenix, AZ (US); Brent D. Thomas, Chandler, AZ (US); Reshma Lal, Portland, OR (US); Pradeep M. Pappachan, Tualatin, OR (US); Akshay Kadam, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,621

(22) Filed: Oct. 3, 2022

(65) Prior Publication Data

US 2023/0026602 A1 Jan. 26, 2023

Related U.S. Application Data

(63) Continuation of application No. 16/774,719, filed on Jan. 28, 2020, now Pat. No. 11,461,483.

(51) Int. Cl.
*G06F 21/00* (2013.01)
*G06F 21/60* (2013.01)
(Continued)

(52) U.S. Cl.
CPC ........... *G06F 21/606* (2013.01); *G06F 21/76* (2013.01); *H04L 9/0827* (2013.01); *H04L 9/14* (2013.01); *G06F 2221/2149* (2013.01)

(58) Field of Classification Search
CPC .................. G06F 21/606; G06F 21/76; G06F 2221/2149; G06F 21/53; H04L 9/0827; H04L 9/14; H04L 9/3242; H04L 9/0897
See application file for complete search history.

(56) References Cited

U.S. PATENT DOCUMENTS

| | | | |
|---|---|---|---|
| 8,321,657 B2 * | 11/2012 | Pant | G06F 21/606 726/22 |
| 2016/0014159 A1 * | 1/2016 | Schrecker | H04L 63/20 726/1 |

(Continued)

OTHER PUBLICATIONS

Non-Final Office Action for U.S. Application No. AC4574-US dated Feb. 28, 2022, 12 pages.

(Continued)

*Primary Examiner* — Kendall Dolly
(74) *Attorney, Agent, or Firm* — Jaffery Watson Mendonsa & Hamilton LLP (57) ABSTRACT

Embodiments are directed to protection of communications between a trusted execution environment and a hardware accelerator utilizing enhanced end-to-end encryption and inter-context security. An embodiment of an apparatus includes one or more processors having one or more trusted execution environments (TEEs) including a first TEE to include a first trusted application; an interface with a hardware accelerator, the hardware accelerator including trusted embedded software or firmware; and a computer memory to store an untrusted kernel mode driver for the hardware accelerator, the one or more processors to establish an encrypted tunnel between the first trusted application in the first TEE and the trusted software or firmware, generate a (Continued)

call for a first command from the first trusted application, generate an integrity tag for the first command, and transfer command parameters for the first command and the integrity tag to the kernel mode driver to generate the first command.

9 Claims, 7 Drawing Sheets

(51) Int. Cl.
*G06F 21/76* (2013.01)
*H04L 9/08* (2006.01)
*H04L 9/14* (2006.01)

(56) References Cited

U.S. PATENT DOCUMENTS

| | | | |
|---|---|---|---|
| 2017/0024584 A1* | 1/2017 | Chhabra | G06F 21/57 |
| 2019/0042766 A1* | 2/2019 | Pappachan | G06F 21/606 |
| 2019/0220601 A1* | 7/2019 | Sood | G06F 9/505 |
| 2019/0220721 A1* | 7/2019 | Chhabra | G06K 19/0724 |
| 2020/0320199 A1* | 10/2020 | Sheth | H04L 63/0823 |
| 2021/0173917 A1* | 6/2021 | Cheng | H04L 9/3247 |
| 2021/0281408 A1* | 9/2021 | Liu | H04W 12/04 |

OTHER PUBLICATIONS

Notice of Allowance for U.S. Application No. AC4574-US dated Jun. 13, 2022, 11 pages.
P. Jauernig, A. Sadeghi and E. Stapf, "Trusted Execution Environments: Properties, Applications, and Challenges," in IEEE Security & Privacy, vol. 18, No. 2, pp. 56-60, Mar.-Apr. 2020, doi: 10.1109/MSEC.2019.2947124. (Year: 2020).

* cited by examiner

PROTECTION OF COMMUNICATIONS BETWEEN TRUSTED EXECUTION ENVIRONMENT AND HARDWARE ACCELERATOR UTILIZING ENHANCED END-TO-END ENCRYPTION AND INTER-CONTEXT SECURITY

CLAIM TO PRIORITY

This application is continuation of and claims the benefit of and priority to U.S. patent application Ser. No. 16/774,719, entitled PROTECTION OF COMMUNICATIONS BETWEEN TRUSTED EXECUTION ENVIRONMENT AND HARDWARE ACCELERATOR UTILIZING ENHANCED END-TO-END ENCRYPTION AND INTER-CONTEXT SECURITY, by Salessawi Ferede Yitbarek, et al., filed Jan. 28, 2020 and now issued as U.S. Pat. No. 11,461,483, the entire contents of which are incorporated herein by reference.

TECHNICAL FIELD

Embodiments described herein generally relate to the field of electronic devices and, more particularly, protection of communications between a trusted execution environment and a hardware accelerator utilizing enhanced end-to-end encryption and inter-context security.

BACKGROUND

Data processing has been increasingly transferred to cloud operations to reduce costs and increase efficiencies. There are concerns with regard to security of sensitive data, which might be subject to attack in cloud processing. Certain existing processor technologies enable cloud customers to run security sensitive workloads on the public cloud without being required to trust the cloud service providers' infrastructure.

However, computing may also be improved through the use of hardware accelerators, which allow for offloading of workloads to hardware elements that are capable providing processing efficiency that cannot be provided through software running on general purpose processors. The known trusted execution solutions generally do not extend to protect execution that is offloaded to hardware accelerators, thus limiting the effective use of hardware accelerator technologies for processing.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to protection of communications between a trusted execution environment and a hardware accelerator utilizing enhanced end-to-end encryption and inter-context security.

Certain CPU technologies, such as TEEs (Trusted Execution Environments) including Intel® Software Guard Extensions (SGX), enable cloud customers to run security sensitive workloads on the public cloud without having to trust the cloud service providers' infrastructure. However, trusted execution solutions generally do not address execution of workloads offloaded to hardware accelerators, which are utilized to improve processing performance.

The complexity of the issue of workloads offloaded to accelerators results from several factors, with the key factors being the following: (1) A customer may run multiple applications simultaneously, which have different contexts and require context level isolation; (2) There are TEEs, such as SGX, that do not include Ring 0 drivers in the trust boundary. (Ring 0, or kernel mode, refers to a software level with the highest level of privileges and having the most direct access to resources, while Ring 3 commonly refers to application software.) Because Ring 0 drivers are involved in managing accelerator resources and because of their assignment to different contexts, exploitation of Ring 0 software could result in corrupting the computation.

Existing technologies to address processing of workloads generally suffer from one or more of the following limitations: (i) The technology is closely tied to specific TEE architectures, and have longer design-to-product time as implementation of the technology requires extensive hardware modifications to the host SoC (System on Chip), (ii) The technology is designed specifically for FPGAs (Field Programmable Gate Arrays) and cannot be readily adopted by all accelerators; or (iii) The technology does not meet stringent security requirements of a Ring 3 TEE (such as SGX).

As used herein, "hardware accelerator" refers to a hardware device structured to provide for efficient processing. In particular, a hardware accelerator may be utilized to provide for offloading of certain processing tasks from a central processing unit (CPU) or other general processor, wherein the hardware accelerator may be intended to provide more efficient processing of the processing tasks than software run on the CPU or other processor. A hardware accelerator may include, but is not limited to, a graphics processing unit (GPU), neural processing unit, AI (Artificial Intelligence) processor, field programmable gate array (FPGA), or application-specific integrated circuit (ASIC).

In some embodiments, security mechanisms in an apparatus or system enable privacy sensitive applications running inside trusted execution environments, such as SGX and TDX (Trusted Data Exchange), to securely offload workloads to a high-performance accelerator. The security mechanisms may be applied to enable cloud customers to provide confidential computing on heterogeneous environments consisting of CPUs and accelerators, with high device utilization through protected offload of multiple concurrent contexts.

Figure 1:
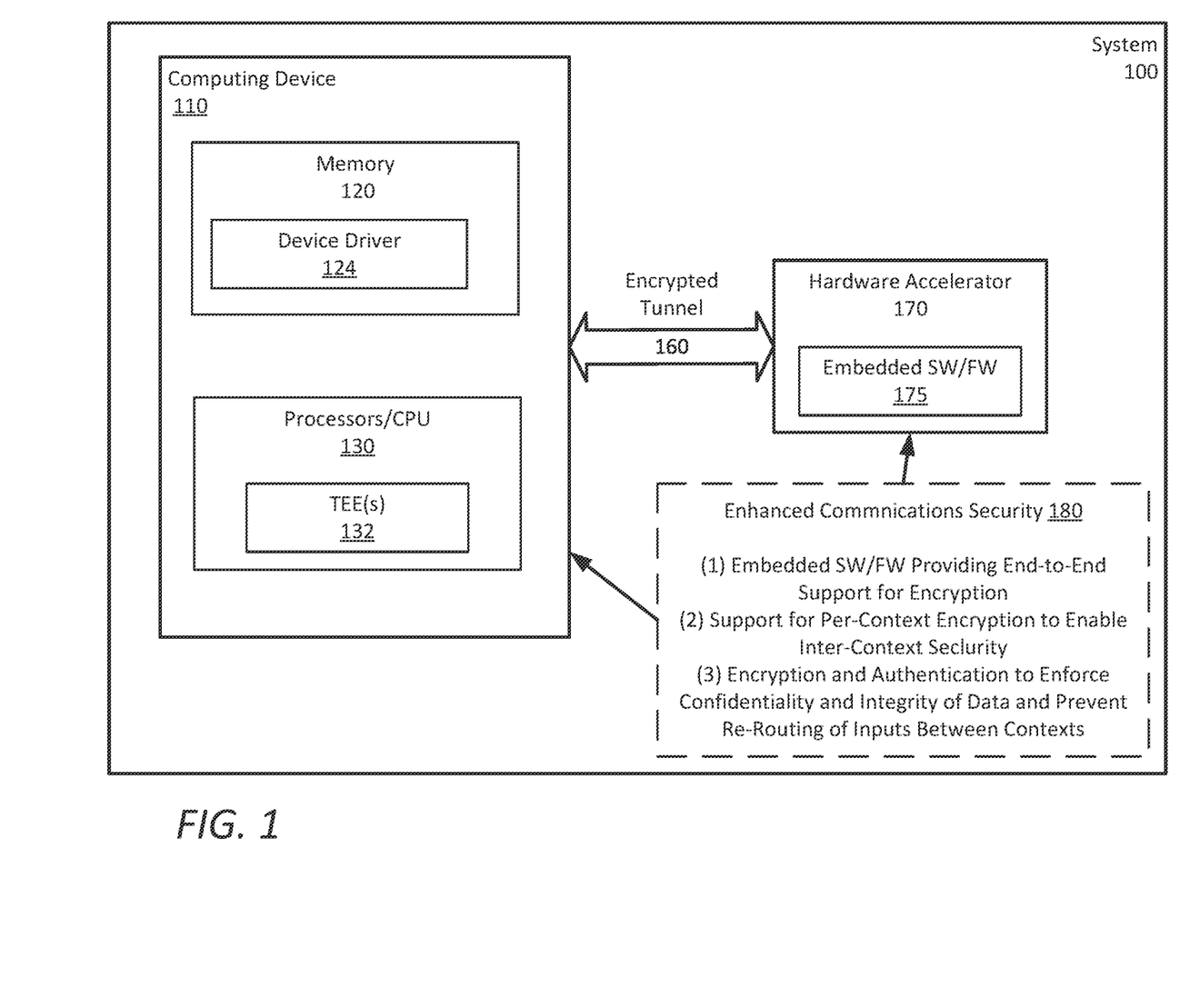
FIG. 1 is an illustration of a system to provide secure communication between a trusted execution environment and a hardware accelerator according to some embodiments.

FIG. 1 is an illustration of a system to provide secure communications between a trusted execution environment and a hardware accelerator according to some embodiments. As illustrated in FIG. 1, a computing device 110 (a host computing device) includes computer memory 120, which includes storage for a device driver 124. The computing device 110 further includes one or more processors 130, which may include a central processing unit (CPU) or other processor, the one or more processors 130 including one or more trusted execution environments (TEEs) 132.

Figure 2:
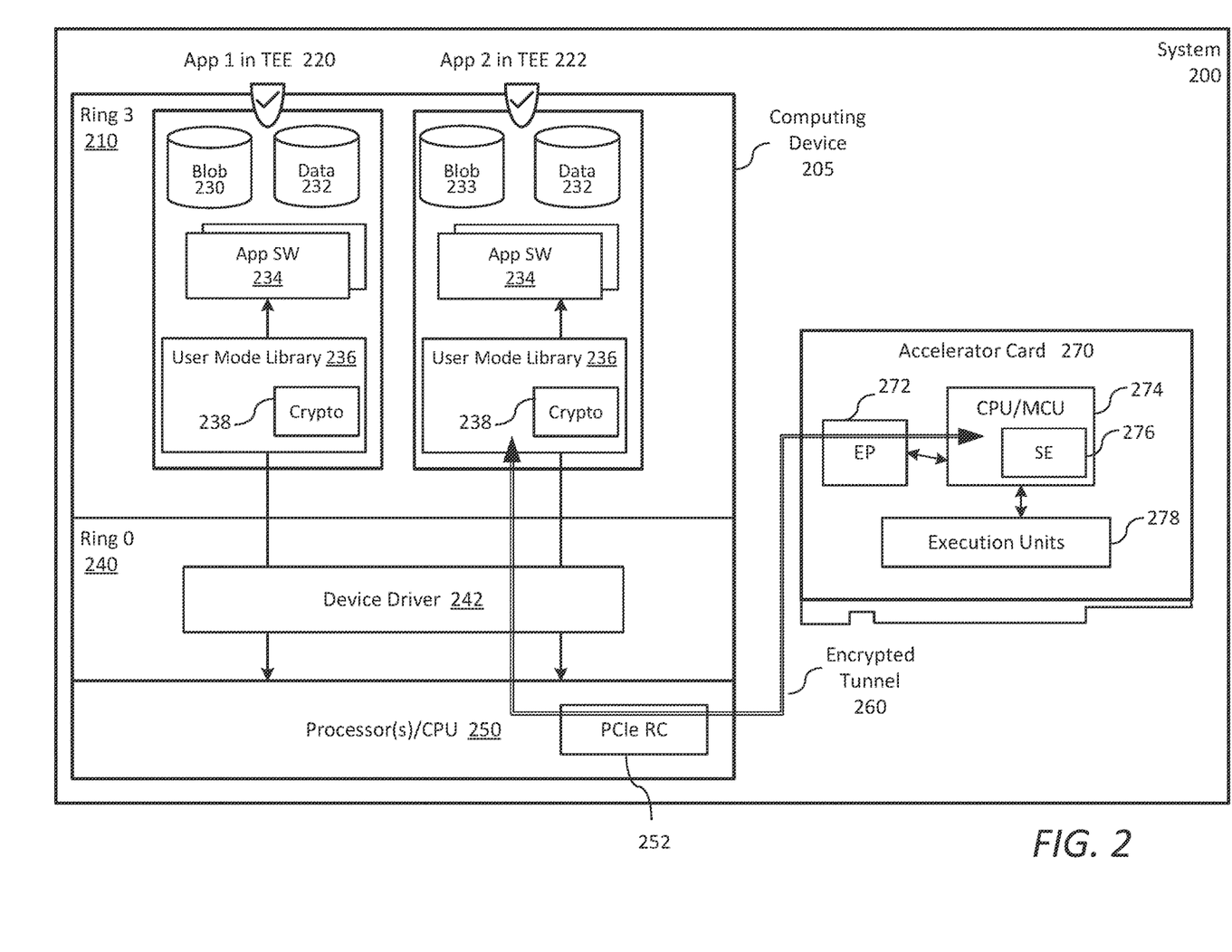
FIG. 2 is an illustration of an architecture including an encrypted tunnel between software running in a trusted execution environment and an accelerator card according to some embodiments.
Figure 7:
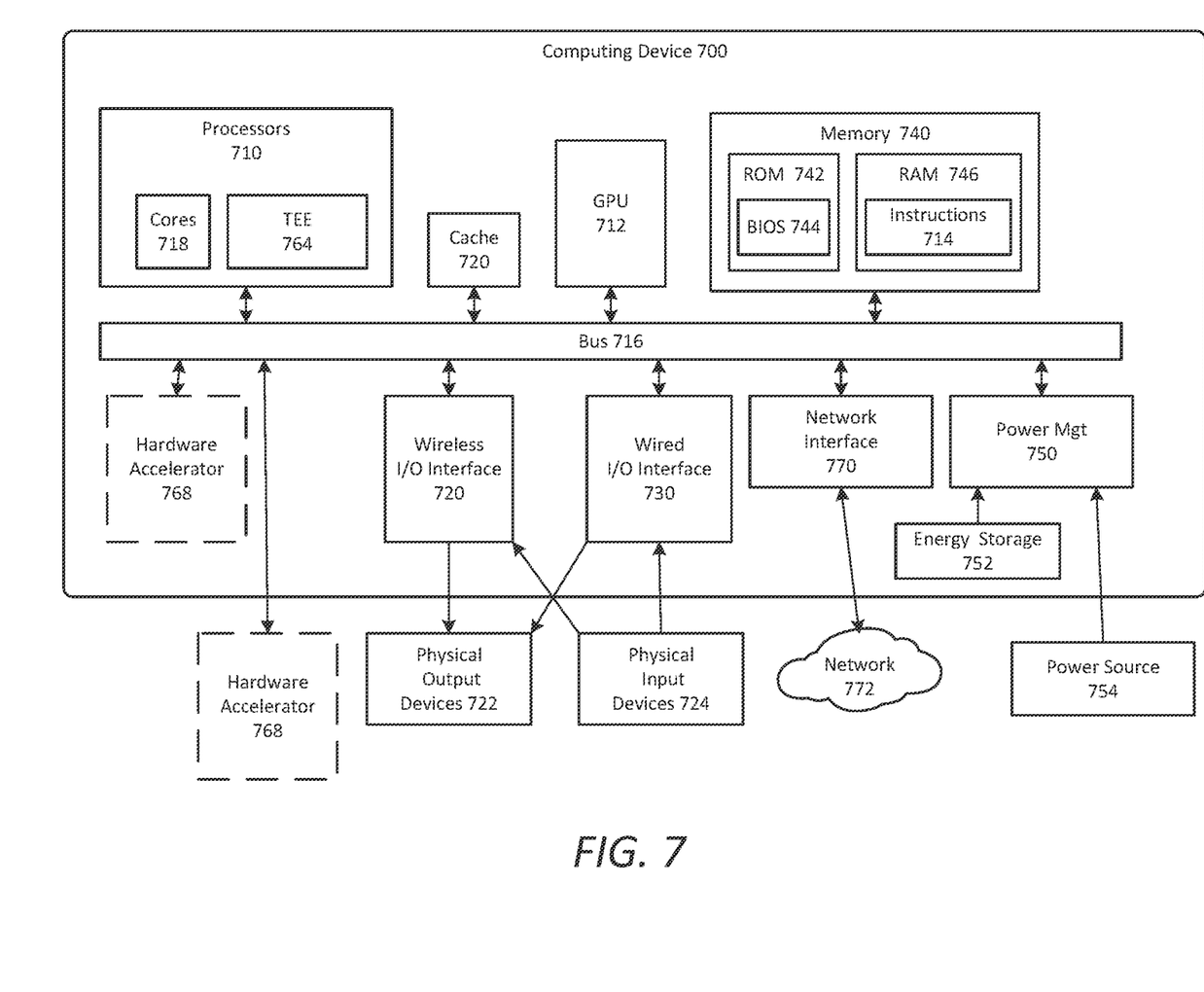
FIG. 7 is a schematic diagram of an illustrative electronic computing device to enable protection of a communication interface between a trusted execution environment and a hardware accelerator according to some embodiments.

The system 100 further includes a hardware accelerator 170 to provide for offloading of certain processing tasks from the CPU, wherein the hardware accelerator 170 may provide more efficient processing of the processing tasks. The hardware accelerator 170 may include, but is not limited to, an apparatus structured as a computer card or similar element that is plugged into a slot in the computing device 110 or is otherwise coupled with the computing device 110. Other elements of the computing device 110 and system 100 may be as illustrated in FIGS. 2 and 7 and as further described below.

However, the introduction of the hardware accelerator 170 creates a potential issue regarding the security of data directed through an interface between the computing device 110 and the hardware accelerator 170, thus exposing data to potential attack.

In some embodiments, the system 100 includes an interface with hardware to cryptographically attest trustworthiness of software or firmware, wherein the system is to provide enhanced communications security, including:

(1) Trusted embedded software or firmware 175 of the hardware accelerator provides full end-to-end support for encryption of communications between the TEE 132 to the hardware accelerator 170, from attestation and key exchange through to encrypting/decrypting all inputs and commands.

(2) The system 100 supports per-context encryption for multiple execution contexts to enable security between any of the multiple contexts.

(3) The system utilizes encryption and authentication as a main mechanism to (i) enforce confidentiality and integrity of data, and (ii) prevent re-routing of inputs from one context to another.

In some embodiments, an encrypted tunnel 160 is created between software running in a TEE 132 on the host CPU 130 and an authenticated embedded software/firmware 175 running in the hardware accelerator 170. In some embodiments, each execution context offloading workloads to the accelerator 170 has a set of unique encryption keys assigned to it, and all user data exchanged between the TEE and the accelerator 170 is encrypted and integrity protected using specific keys assigned to the execution context.

Further, control commands, such as MMIO (Memory-Mapped I/O) commands, sent to the accelerator 170 are digitally signed by the TEE 132 using the context's secret MAC (Message Authentication Code) keys. The generated MAC tags are then verified by the trusted embedded software running on the accelerator 170. In some embodiments, the IO protocol is modified to enable the Ring 0 driver to be in charge of resource management for the contexts while adding a mechanism to verify correct assignments from within the TEEs on the host side and device side. This is achieved without requiring new hardware on the CPU or IO interconnect.

FIG. 2 is an illustration of an architecture including an encrypted tunnel between software running in a trusted execution environment and an accelerator card according to some embodiments. As illustrated in FIG. 2, a computing device 205 is coupled with a hardware accelerator in the form of an accelerator card 270, the computing device 205 and accelerator 270 being components of a system 200. As illustrated, the computing device 205, which may include elements illustrated for computing device 700 in FIG. 7, includes one or more processors such as a CPU 250 and software illustrated as Ring 3 software 210 and Ring 0 software 240.

Within Ring 3 software 210 is a first application (App-1) in a TEE 220 and a second application (App-2) in a TEE 222, with the elements for each application including, for example, blob (binary large object) 230, data 232, application software 234, and user mode library 236 include cryptography 238. Within Ring 0 is an untrusted kernel mode device driver 242 for the accelerator card 270. As illustrated, the CPU include PCIe RC (Peripheral Component Interconnect Express Root Complex) 252 for an interface with the accelerator card 270, the accelerator card 270 including EP (endpoint) 272, a processor such as a CPU or MCU (Micro Controller Unit) 274 including secure enclave 276, and execution units 278.

In some embodiments, a secure tunnel 260 is established between the trusted software of the computing device 205 and an attested embedded software running on the accelerator card 270. Before the secure tunnel 260 is established, the accelerator card 270 is to attest to the TEE to verify that the accelerator device is authentic, and that the software and firmware of the accelerator are untampered. In some embodiments, each application running in the TEE 220-222 may also attest to the accelerator 270 to verify that the application is authentic and untampered. The two ends of the communication then conduct a key exchange to enable establishment of the secure tunnel 260. After an encrypted tunnel 260 is created, data exchanged between the software in the computing device 205 and the accelerator 270 is transferred over this protected channel. Further, commands sent to the accelerator card 270, such as via MMIO writes/reads, are integrity protected using secret keys.

In some embodiments, the computing device 205 and accelerator card 270 of the system 200 employ a multi-key encryption approach to enable inter-context security, wherein the system is to prevent malicious privileged software from redirecting inputs from one context, such as the context for App-1, to another context, such as the context for App-2.

In addition, commands from the trusted applications are integrity protected with a MAC tag (which may also be referred to as an integrity tag), and the untrusted kernel-mode device driver 242 attaches this MAC tag along with the MMIO commands it sends to the accelerator 270. In this manner, the operating system will be able to continue to perform global resource management, or deny access to certain operations, while at the same time allowing the trusted application and the accelerator 270 to communicate over a trusted channel.

Figure 3:
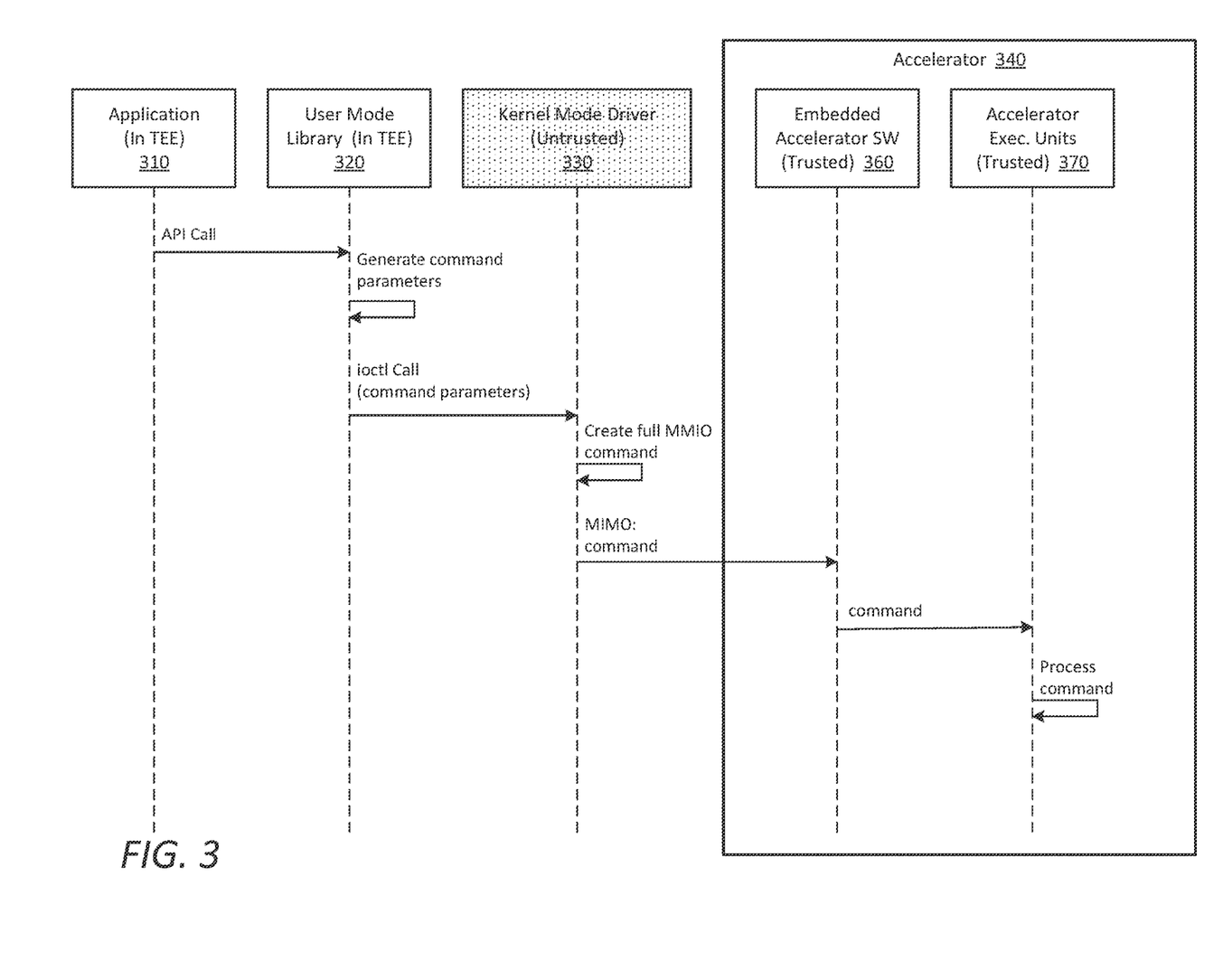
FIG. 3 is a diagram to illustrate an MMIO communication flow for communications between an application in a trusted execution environment and a hardware accelerator according to some embodiments.

FIG. 3 is a diagram to illustrate an MMIO communication flow for communications between an application in a trusted execution environment and a hardware accelerator according to some embodiments. As illustrated in FIG. 3, data and commands are exchanged between an application 310 in a TEE (such as App-1 in TEE 220 or App-2 in TEE 222 illustrated in FIG. 2) of a host device, a user mode library 320 in the TEE (such as user mode library 236), a kernel mode driver 330 (such as kernel mode device driver 242) that is untrusted, and an accelerator 340 (such as accelerator card 270) including embedded accelerator software 360 and accelerator execution units (or other processing elements) 370.

While data exchanged between the application 310 and accelerator 340 can be encrypted in a straightforward manner, enforcing integrity of MMIO commands requires additional considerations. FIG. 3 illustrates an example flow whereby the application 310 makes a system call to the kernel mode driver 330, and the kernel mode driver 330 sends the appropriate command to the accelerator 340 via MMIO. In this case, the application 310 cannot directly write to the hardware accelerator's MMIO region, and the operating system is to perform certain management functions and send the appropriate command to the accelerator (as opposed to cases where user mode applications have direct access to hardware's MMIO regions).

For example, as illustrated in FIG. 3, the application 310 provides an API (Application Programming Interface) call to the user mode library 320. The user mode library 320 is to generate command parameters and provide an ioctl (I/O Control) call with command parameters to the kernel model driver 330. The kernel mode driver 330 then creates and transfers the full MMIO command to the embedded accelerator software 360. The embedded accelerator software 360 is then to provide the command to the accelerator execution units 370, which process the command.

However, in the communication flow illustrated in FIG. 3, it is possible for a compromised operating system to provide malicious MMIO commands to the accelerator, with the accelerator generally having no mechanism to detect that commands did not originate from the trusted software.

In some embodiments, the MMIO communication flow illustrated in FIG. 3 is modified to enable enhanced security in the communication flow by providing authentication of commands, thereby enabling the secure communication across the untrusted kernel mode driver 330. Details regarding the amended MMIO command flow are illustrated in FIG. 4.

Figure 4:
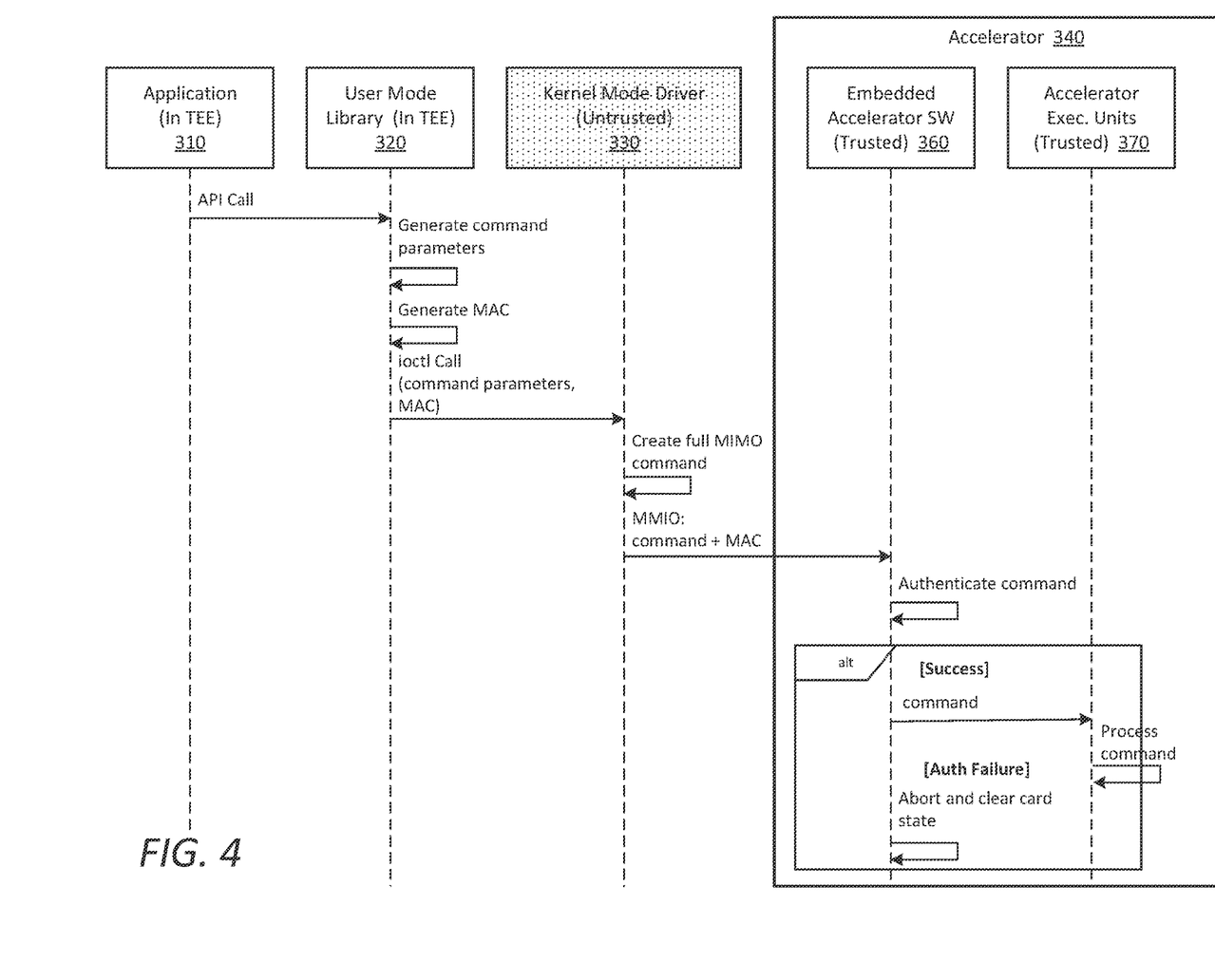
FIG. 4 is a diagram to illustrate an MIMO communication flow for communications between an application in a trusted execution environment and a hardware accelerator providing protection of MMIO commands according to some embodiments.

FIG. 4 is a diagram to illustrate an MMIO communication flow for communications between an application in a trusted execution environment and a hardware accelerator providing protection of MMIO commands according to some embodiments. As illustrated in FIG. 4, data and commands are again exchanged between the application 310 in a TEE, the user mode library 320 in the TEE, the untrusted kernel mode driver 330, and the accelerator 340 including embedded accelerator software 360 and accelerator execution units 370.

FIG. 4 illustrates a protected MMIO communication flow, wherein the trusted software attaches a message authentication code (MAC) tag that protects the integrity of security sensitive portions of a command's parameters. When the operating system sends the MMIO command to the accelerator device, the operating system also provides the MAC tag. The embedded software on the accelerator 340 can then verify the contents of the MMIO command against the MAC tag to ensure that the MMIO command reflects the operation the trusted software is trying to perform. In some embodiments, all replies from the accelerator to the host are also authenticated, and with trusted software on the host verifying the MAC tag. In some embodiments, the computing device and accelerator further employ a multi-key encryption approach utilizing a separate encryption key for each context to provide inter-context security, the system to prevent malicious privileged software from redirecting inputs from one context to another context.

For example, the application 310 provides an API call to the user mode library 320. The user mode library 320 is to generate the command parameters, and further generate a MAC tag. The user mode library 320 then provides the ioctl call to the kernel mode driver 330, the call including both the command parameters and the generated MAC tag. The kernel mode driver 330 then creates the full MMIO command, and transfers the MMIO command and MAC tag to the embedded accelerator software 360. The embedded accelerator software 360 is then to authenticate the MMIO command utilizing the MAC tag. As shown in FIG. 4 for the alternative results, if the authentication of the command is a success, the embedded accelerator software 360 is then to provide the command to the accelerator execution units 370, which then can process the command. However, if the authentication of the command results in a failure, the embedded accelerator software 360 is to abort the command and clear the accelerator card state.

Because only the trusted software and the accelerator have access to the secret keys used to generate a valid MAC, the operating system cannot forge the authentication tags and cause the accelerator to execute commands that did not originate from the trusted application. Depending on the specific implementation, the MAC tag can be a separate MMIO write, or the MMIO commands can be expanded in size to include a MAC tag within them.

Further, upon authentication failure, the accelerator 340 may then attempt to send an integrity protected notification to the host, and then scrub internal state and reset to prevent the attacker from taking further action.

It is noted that blocking of any transactions between host and accelerator by compromised software or other malicious agent simply results in a denial-of-service (DoS) occurrence and not the transmission of an infected command. The DoS event is not within the scope of this discussion.

Figure 5:
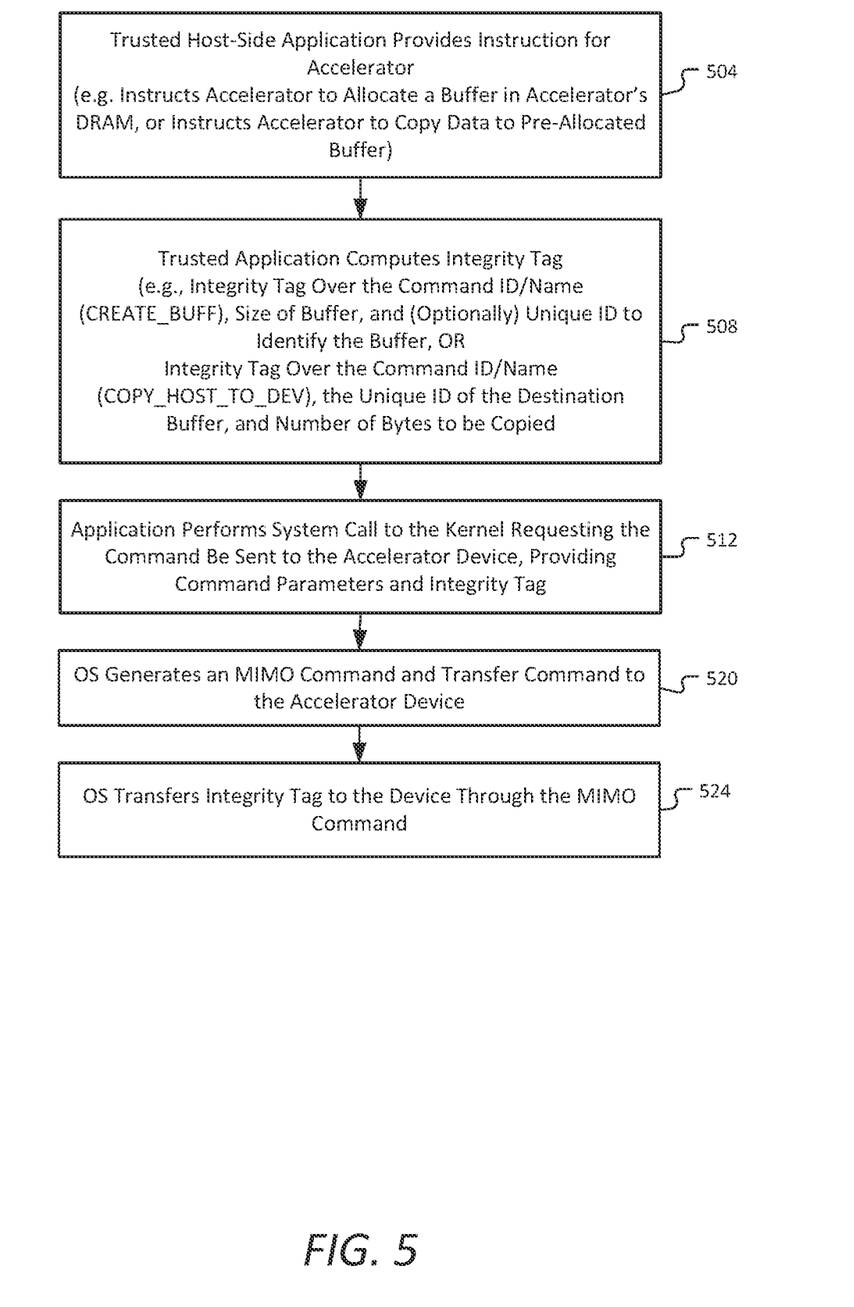
FIG. 5 is a flowchart to illustrate a process for operations at a computing device to provide for secure communications with a hardware accelerator according to some embodiments.

FIG. 5 is a flowchart to illustrate a process for operations at a computing device to provide for secure communications with a hardware accelerator according to some embodiments. The communications may be, for example, between the computing device 205 (as a host device) and the accelerator card 270 (as an hardware accelerator to receive workloads from the host device) in FIG. 2 In some embodiments, a trusted host-side application provides an instruction for an accelerator 504. The instruction may be, for example, an instruction to allocate a buffer in memory (such as accelerator's DRAM (Dynamic Random Access Memory) or other memory of the accelerator), or an instruction to copy data to a pre-allocated buffer in memory.

In some embodiments, the trusted host-side application is to compute an integrity tag to enable authentication of validity of the instruction by the accelerator 508. For example, for an instruction to create a buffer in memory, the integrity tag may be computed over the command ID or name (CREATE_BUFF), a size of the buffer to be generated, and (optionally) a unique ID to identify the buffer. In an additional example, for an instruction to copy data to a buffer may be computed over the command ID/name (COPY_HOST_TO_DEV), a unique ID of the destination buffer, and a number of bytes of data to be copied. In some embodiments, the computing device and accelerator further employ a multi-key encryption approach utilizing a separate encryption key for each context to prevent malicious privileged software from redirecting inputs from one context to another context.

In some embodiments, the trusted application performs the system call to the kernel driver requesting that the command be sent to the accelerator device, with request including the command parameters and the integrity tag 512. The operating system is to generate a MMIO command, and transfer the command to the accelerator device 520, with the operating system to transfer the integrity tag to the accelerator device through the MMIO command 524.

It is further noted that replies from the accelerator device to the host may also be authenticated in a similar manner as provided in FIG. 5, with the trusted software on the accelerator device to generate a integrity tag based on the reply to enable trusted software on the host to verify the reply utilizing the integrity tag.

Figure 6:
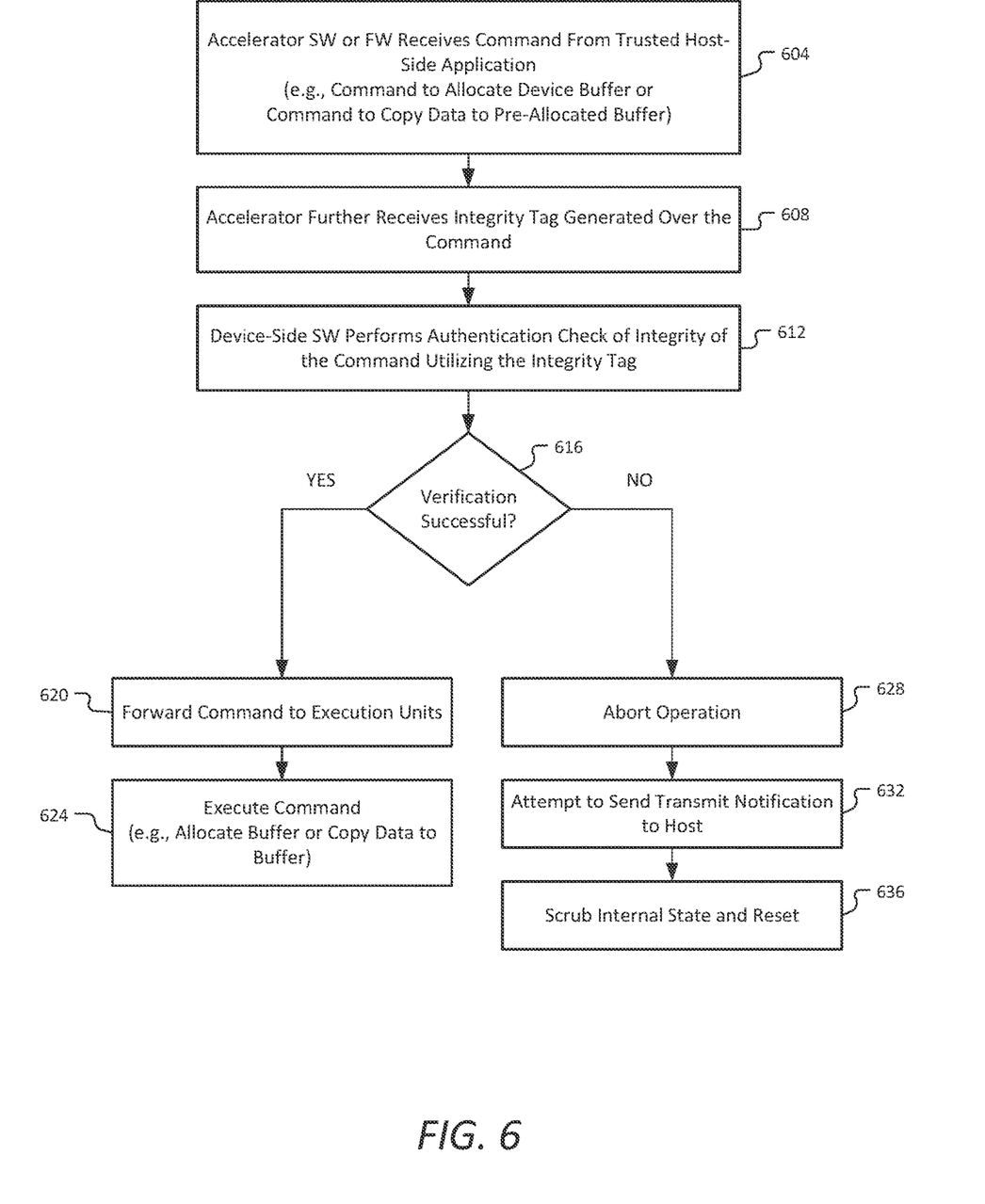
FIG. 6 is a flowchart to illustrate a process for operations at a hardware accelerator to provide for secure communications with a device according to some embodiments.

FIG. 6 is a flowchart to illustrate a process for operations at a hardware accelerator to provide for secure communications with a device according to some embodiments. In an operation, trusted accelerator software or firmware is to receive a command from a trusted host-side application 604, such as a command to allocate a device buffer or a command to copy data from the host to a pre-allocated buffer (commands provided as examples in FIG. 5). However, the command may be received via an untrusted kernel mode driver, such as the kernel mode driver 330 illustrated in FIGS. 3 and 4.

In some embodiments, the accelerator software or firmware is further to receive an integrity tag generated over the command 608, such as in the operation element 508 illustrated in FIG. 5. The accelerator device-side software or firmware is to perform an authentication check of integrity of the received command utilizing the integrity tag 612.

Upon successful authentication of the received command 616, the accelerator device software is to forward the received command to execution units of the accelerator device 620, with the execution units to execute the command 624, such as allocating a buffer, or copying data to a pre-allocated buffer, as requested.

If the authentication is not successful, the accelerator device is to abort the operation 628, and attempt to send a notification to the host regarding the aborted operation 632 (which in certain circumstances could be blocked if the system is compromised). The accelerator is then to scrub an internal state, and reset the accelerator 636.

FIG. 7 is a schematic diagram of an illustrative electronic computing device to enable protection of communications between a trusted execution environment and a hardware accelerator according to some embodiments. The computing device 700 may perform operations as illustrated in one or more of FIGS. 1-6. In some embodiments, the computing device 700 includes one or more processors including one or more processors cores and a TEE or secure enclave 764 to enable maintenance of security of data, as TEE 220 or 222 of computing device 205 illustrated in FIG. 2. In some embodiments, the computing device 700 includes a hardware accelerator 768, such as accelerator card 270 illustrated in FIG. 2, the hardware accelerator 768 including trusted software or firmware. As shown in FIG. 7, the hardware accelerator may be an internal or external device, depending on the configuration of the computing device 700. In some embodiments, the computing device 700 and hardware accelerator 768 are to establish an encrypted tunnel for secure communications between the computing device and hardware accelerator.

The computing device 700 may additionally include one or more of the following: cache 720, a graphical processing unit (GPU) 712 (which may be the hardware accelerator in some implementations), a wireless input/output (I/O) interface 720, a wired I/O interface 730, memory circuitry 740, power management circuitry 750, non-transitory storage device 760, and a network interface 770. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 720, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include, but are not limited to: universal serial bus (USB), IEEE 1394 ("FireWire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

In some embodiments, an apparatus includes one or more processors having one or more trusted execution environments (TEEs) including a first TEE, the first TEE to include a first trusted application; an interface with a hardware accelerator, the hardware accelerator including trusted software or firmware; and a computer memory to store a kernel mode driver for the hardware accelerator, the kernel mode driver being untrusted, wherein the one or more processors are to establish an encrypted tunnel between the first trusted application in the first TEE and the trusted software or firmware of the hardware accelerator, generate a call for a first command from the first trusted application, generate an integrity tag for the first command, and transfer command parameters for the first command and the integrity tag to the kernel mode driver to generate the first command.

In some embodiments, the kernel mode driver is to transmit the first command and the integrity tag to the trusted software or firmware of the hardware accelerator.

In some embodiments, establishing the encrypted tunnel includes utilizing a first encryption key of a plurality of encryption keys, the first encryption key being dedicated to a first context of a plurality of contexts for the first trusted application.

In some embodiments, a different key of the plurality of encryption keys is dedicated to each of the plurality of contexts to prevent misdirecting of inputs between the plurality of contexts.

In some embodiments, the hardware accelerator is an accelerator card for plugging into the apparatus.

In some embodiments, the one or more processors are further to receive a first reply to the first command at the kernel mode driver, the reply including a second integrity tag generated by the trusted software or firmware of the hardware accelerator; transfer the first reply to first trusted application; and authenticate the first reply based on the second integrity tag.

In some embodiments, the one or more processors include a central processing unit (CPU).

In some embodiments, one or more non-transitory computer-readable storage mediums having stored thereon executable computer program instructions that, when executed by one or more processors, cause the one or more processors to perform operations including establishing an encrypted tunnel between a first trusted application in a first trusted execution environment (TEE) of a computing device and trusted software or firmware of a hardware accelerator; generating a call for a first command from the first trusted application; generating an integrity tag for the first command; transferring command parameters for the first command and the integrity tag to an untrusted kernel mode driver for the hardware accelerator to generate the first command.

In some embodiments, the instructions include instructions for transferring the first command and the integrity tag from the kernel mode driver to the trusted software or firmware of the hardware accelerator.

In some embodiments, the instructions include instructions for receiving the first command and the integrity tag at the trusted software or firmware of the hardware accelerator; and authenticating the first command based on the integrity tag.

In some embodiments, the instructions include instructions for, upon the authentication of the first command being successful, processing the first command at the hardware accelerator; and, upon the authentication of the first command being unsuccessful, aborting operation of the first command and clearing a state of the hardware accelerator.

In some embodiments, establishing the encrypted tunnel includes a key exchange between the first trusted application and the trusted software or firmware of the hardware accelerator.

In some embodiments, generating the encrypted tunnel between the first trusted application and the trusted software or firmware of a hardware accelerator includes utilizing a first encryption key of a plurality of encryption keys, the first encryption key being dedicated to a context of the first trusted application.

In some embodiments, a different key of the plurality of encryption keys is dedicated to each of the plurality of contexts to prevent misdirecting of inputs between the plurality of contexts.

In some embodiments, a system includes a host computing device; and a hardware accelerator coupled with the host computing device, the hardware accelerator is to store trusted software or firmware, wherein the host computing device includes one or more processors including a CPU, the one or more processors including one or more trusted execution environments (TEEs) including a first TEE, the first TEE to include a first trusted application, and a computer memory, the computer memory to store a kernel mode driver for the hardware accelerator, the kernel mode driver being untrusted; and wherein the one or more processors of the host computing device are to generate an encrypted tunnel between the first trusted application in the first TEE and the trusted software or firmware of the hardware accelerator; generate a call for a first command from the first trusted application, generate a Message Authentication Code (MAC) tag for the first command, and transfer command parameters for the first command and the MAC tag to the kernel mode driver, the kernel mode driver to generate the first command and to transmit the first command and the MAC tag to the trusted software or firmware of the hardware accelerator.

In some embodiments, establishing the encrypted tunnel includes utilizing a first encryption key of a plurality of encryption keys, the first encryption key being dedicated to a context of the first trusted application.

In some embodiments, the hardware accelerator is to receive the first command and the MAC tag at the trusted software or firmware of the hardware accelerator; and authenticate the first command based on the MAC tag.

In some embodiments, the hardware accelerator is further to, upon the authentication of the first command being successful, process the first command; and, upon the authentication of the first command being unsuccessful, abort operation of the first command and clear a state of the hardware accelerator.

In some embodiments, the one or more processors of the host computing device are further to receive a first reply to the first command at the kernel mode driver, the reply including a second MAC tag generated by the trusted software or firmware of the hardware accelerator; transfer the first reply to first trusted application; and authenticate the first reply based on the second MAC tag.

In some embodiments, the hardware accelerator is an accelerator card for plugging into the host computing device.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
    one or more processors having one or more trusted execution environments (TEEs) including a first TEE, the first TEE to include a first trusted application;
    an interface with a hardware accelerator, the hardware accelerator including authenticated software or firmware; and
    a computer memory, the computer memory to store a kernel mode driver for the hardware accelerator;
    wherein the one or more processors are to:
        establish a secure channel between the first trusted application in the first TEE and the authenticated software or firmware of the hardware accelerator,
        generate a first data from the first trusted application,
        generate an integrity tag for the first data, and
        transfer the first data and the integrity tag to the hardware accelerator.

2. The apparatus of claim 1, wherein the hardware accelerator includes a graphics processing unit (GPU).

3. The apparatus of claim 1, wherein the one or more processors include a central processing unit (CPU).

4. One or more non-transitory computer-readable storage mediums having stored thereon executable computer program instructions that, when executed by one or more processors, cause the one or more processors to perform operations comprising:
    establishing a secure channel between:
        a first trusted application in a first trusted execution environment (TEE) of one or more processors of an apparatus, and
        authenticated software or firmware of a hardware accelerator of the apparatus, the apparatus including an interface with the hardware accelerator;
    generating a first data from the first trusted application;
    generating an integrity tag for the first data; and
    transferring the first data and the integrity tag to the hardware accelerator;
    wherein the apparatus includes a computer memory, the computer memory to store a kernel mode driver for the hardware accelerator.

5. The one or more mediums of claim 4, wherein the hardware accelerator includes a graphics processing unit (GPU).

6. The one or more mediums of claim 4, wherein the one or more processors include a central processing unit (CPU).

7. A method comprising:
    establishing a secure channel between:
        a first trusted application in a first trusted execution environment (TEE) of one or more processors of an apparatus, and
        authenticated software or firmware of a hardware accelerator of the apparatus, the apparatus including an interface with the hardware accelerator;
    generating a first data from the first trusted application;
    generating an integrity tag for the first data; and
    transferring the first data and the integrity tag to the hardware accelerator;
    wherein the apparatus includes a computer memory, the computer memory to store a kernel mode driver for the hardware accelerator.

8. The method of claim 7, wherein the hardware accelerator includes a graphics processing unit (GPU).

9. The method of claim 7, wherein the one or more processors include a central processing unit (CPU).

* * * * *